United States Patent Office 3,215,549
Patented Nov. 2, 1965

3,215,549
BINDING COMPOSITION AND METHOD OF MAKING SAME
Bernt Sture Jörgen Ericson, Ornskoldsvik, Sweden, assignor to Mo och Domsjö Aktiebolag, Ornskoldsvik, Sweden, a limited company of Sweden
No Drawing. Filed Feb. 27, 1964, Ser. No. 347,703
Claims priority, application Sweden, Feb. 28, 1963, 2,224/63
12 Claims. (Cl. 106—90)

The present invention relates generally to binding or setting compositions and is more particularly concerned with binding compositions which contain an inorganic filler together with a water-soluble nonionic cellulose ether and which may also contain an inorganic binding agent. Such compositions include, e.g., mortar, plaster of Paris, brick paste and mortar for attaching and/or joining tiles or other building elements of organic or inorganic material.

It is well known to add water-soluble cellulose ethers to compositions of the type referred to. From many years of practical experience and extensive laboratory testing it has been established that addition of a water-soluble cellulose ether to a mortar or brick paste imparts to the composition the following desirable and valuable properties:

(1) A considerably improved plasticity or pliability. This effect is particularly marked when the mortar is of a lean character or when it is necessary to use a sand gradation which is not the most suitable for the purpose.

(2) An increased adhesion to brick or stone surfaces and therefore tighter joints.

(3) A reduced or minimized separation of water, depending on the amount of cellulose ether added.

(4) A reduced water requirement (up to 10%) and hence an increased strength and a more rapid drying of the building.

(5) A reduced capillary absorption by the base. Sufficient water is retained by the mortar for its complete and adequate binding or setting.

(6) A reduced tendency to shrinkage and cracking.

The main object of the present invention is to provide further improvements of the desirable properties of binding compositions of the type referred to and containing nonionic water-soluble cellulose ethers.

Another object is to provide a considerably improved adhesive effect, improved water retention and improved strength properties of binding compositions comprising an inorganic filler and a water-soluble cellulose ether and optionally an inorganic binder material as compared to prior art compositions of this type.

These and other objects of the present invention are achieved by adding to the composition together with the water-soluble nonionic cellulose ether a water-soluble salt of a chlorophenol in an amount of 5 to 50% based on the weight of cellulose ether.

It is well known that by adding a phenol derivative to an aqueous solution containing a water-soluble cellulose ether one obtains a thickening action (viscosity increase) and then rather rapidly, on increased addition of the phenol derivative, a flocculation. This effect is previously described and manufacturers of cellulose ethers advise against using certain phenol derivatives in connection with water-soluble cellulose ethers, see, e.g., "The Modocoll E Manual," published by Mo och Domsjö AB, Ornskoldsvik, Sweden (September 1960), page 19, and "Methocel" published by The Dow Chemical Company, Midland, Michigan (1958), page 14.

The thickening effect of chlorinated phenol derivatives is most marked with the sodium salt of pentachlorophenol and decreases with decreasing number of chlorine atoms of the chlorinated phenol.

Surprisingly it was found, however, that when a water-soluble nonionic cellulose ether is added together with a water-soluble salt of a chlorophenol in the amount indicated above to a mortar or paste, i.e., a mixture containing in addition to water one or more filler materials and optionally one or more inorganic binders, one obtains a mortar or paste having considerably improved water retention, adhesion and strength properties.

The inorganic filler material used in the composition of this invention may be any particulate inorganic material having a particle size of not above 4 mm., such as natural sand, stone flour of various types, such as crushed granite, marble, dolomite, quartzite, or sandstone, further vermiculite, kieselguhr and others. The inorganic filler is generally present in an amount of from 1 to 99% of the total composition.

The inorganic binder may be, e.g., Portland cement, aluminate cement, magnesium salt cement (Sorel's cement), slag cement, puzzolan cement or other hydraulic binders, air lime, hydraulic lime, gypsum (plaster of Paris), etc., or any mixture thereof. The amount of the inorganic binder material will generally be from 0 to 99% of the dry weight of the composition.

The water-soluble cellulose ether may be any cellulose etherified with nonionic substituent groups to a degree of substitution such that the cellulose ether is soluble in water. Examples include alkylcelluloses, such as methylcellulose, ethylcellulose, methyl-ethylcellulose, hydroxyalkylcelluloses, such as hydroxyethylcellulose, hydroxypropylcellulose, hydroxyethyl - hydroxypropylcellulose, alkyl-hydroxyalkylcelluloses, such as methyl-hydroxyethylcellulose, methyl-hydroxypropylcellulose, ethyl-hydroxyethylcellulose, ethyl - hydroxypropylcellulose etc. The viscosity of the cellulose ether should be generally at least 500 centipoises as measured in a Brookfield viscometer in a 2% aqueous solution at 20° C., and will generally be within the range of 700 to 12000 centipoises.

The nonionic cellulose ether is generally added to the composition in amount of from 0.1 to 5% based on the dry weight of the total composition. In general, a lower amount within this range is used for a high-viscosity ether, and a greater amount will be used for an ether of lower viscosity.

In this connection it may be noted that ionic cellulose ethers, such as carboxymethylcellulose (CMC) may also be added to compositions of the type contemplated here, but must be added in considerable amounts of the order of 10% to achieve any noticeable effect. Also, to obtain an improvement by means of chlorophenols, these will have to be added in great amounts. Therefore, ionic cellulose ethers are unsatisfactory.

The chlorinated phenol derivative added according to this invention may be any water-soluble salt of ortho-, meta- or para-chlorophenol, 2,3-, 2,4-, 2,5-, 2,6-, 3,4- or 3,5-dichlorophenol, 2,3,4- 2,3,5-, 2,3,6-, 2,4,5-, 2,4,6- or 3,4,5-trichlorophenol, 2,3,4,5-, 2,3,4,6- or 2,3,5,6-tetrachlorophenol or pentachlorophenol. Pentachlorophenol is preferred, because the desirable effects can be obtained with a lower addition of this product and also because the lower chlorinated phenols have a strong odor which makes them undesirable for many uses. Water-soluble salts of these chlorinated phenols include primarily the alkali metal and ammonium salts thereof in particular sodium, potassium and lithium salts.

As above mentioned, the amount of water-soluble phenol salt will generally be from 5 to 50% based on the dry weight of the cellulose derivative. Lower amounts do not result in an appreciable improvement of the adhesive and strength properties of the composition, while with amounts above this range the strength of the composition is reduced and finally disappears depending on the flocculating effect above referred to. For sodium pentachlorophenate which is the preferred addition, the preferred range is 5 to 30% based on the weight of the cellulose ether, while for the less chlorinated derivatives, such as sodium 2,4,5-trichlorophenate the amount necessary to achieve an optimum improvement will be somewhat higher, e.g., 10–50% by weight.

The compositions of this invention are generally intended to be used as a mortar for joining bricks and other building elements, as a mortar for coating building surfaces, as an adhesive for attaching tiles and other building elements of inorganic or organic material to wall or floor surfaces or for joining such tiles and building elements to each other. For such purpose, the compositions of this invention are mixed with the requisite amount of water, as is well known in the art. In addition to the ingredients listed above, other components may be added, as desired, such as asbestos or other inorganic or organic fibrous material.

To prepare the mortar or paste compositions, the cellulose ether and the chlorophenol salt may be added in dry powdered form to the dry mortar or paste mixture together or separately in any sequence or a stock solution of the combination in water can be prepared to be added to the mortar or paste mixtures in suitable proportions. It is also possible to apply the additives as coatings on a carrier material and then add the combination in a pulverulent form, as disclosed in the Swedish Patents 155,354 and 173,344.

The superior water retention property of compositions of this invention is illustrated by a water-absorption test carried out in accordance with the Cement Marketing Company Ltd. and British Standard Method, the water absorption being determined in six layers of filter paper from a certain "mortar cake" is measured exactly. The results of such tests are tabulated below.

TABLE I.—WATER ABSORPTION FROM MORTAR

Mortar mixture:
    30% by weight of Portland cement
    35% by weight of crushed marble (maximum particle size 0.5 mm.)
    35% by weight of crushed marble (max. particle size 0.35 mm.)

| Test Series No. | Water, ml./kg. of mortar | Ethyl-hydroxyethyl-cellulose, g./kg. of mortar | | Na pentachlorophenate, g./kg. mortar | Water absorption, g./kg. mortar |
|---|---|---|---|---|---|
| | | Medium visc. | High visc. | | |
| 1 | 223 | 0 | 0 | 0 | 3.24 |
| 2 | 223 | 10 | 0 | 0 | 0.47 |
| 3 | 223 | 10 | 0 | 1.5 | 0 |
| 4 | 223 | 0 | 10 | 0 | 0.45 |
| 5 | 223 | 0 | 10 | 1.0 | 0 |

The table shows that the water absorption disappears entirely when a mortar prepared in accordance with this invention is placed in the absorption apparatus. Thus, it retains its water to 100% as distinguished from a mortar containing no additive (Test Series 1) and mortars containing a cellulose ether alone as additive (Test Series 2 and 4).

The adhesive effect obtained with mortar or paste in accordance with this invention manifests itself, e.g., when a thin layer of the mortar or paste is spread on a vertical wall surface and an ordinary ceramic tile (10 x 10 cm.) is pressed fast in this layer. The ceramic tile will then immediately remain fixed in exactly the position wherein it is left. Tests have been carried out in which a load was applied to the tile immediately after it was attached, but a load of 2.0 kg. has caused no sliding of the tile. The mortar and pastes contemplated here when stirred show a long almost latex-like character and are very smooth to work with. This is also true when they are applied to a dry, highly absorbing base.

An ancillary effect of the addition of chlorophenol salts, in particular sodium pentachlorophenate, is that the composition is protected from attack by fungi.

The improvement in strength properties of the mortars and pastes after setting is considerable, which is apparent from the results shown in the following examples, which illustrate various embodiments of the compositions of this invention and different manners of using them. In these examples, all parts and percentages are by weight.

The strength properties were determined in most examples as the shear strength in a joint between two tiles of ceramic materials according to American Standard Specification for Dry Set Portland Cement Mortar, A118.1–1959. In the case of brick paste (Table X) the bending tensile strength between two joined testing bodies of the dimensions 10 x 12 x 15 cm. was determined.

*Example 1*

A Portland cement mortar composition comprising 15% of Portland cement and 85% of filler (crushed marble, maximum particle size 0.75 mm.) to which was added 15 g. of high viscosity ethyl-hydroxyethylecellulose (EHEC) per kg. of dry mortar was used to join ceramic tiles (absorbing material) and the shear strength of the joint was determined after 7 days. The results obtained with varying additions of sodium pentachlorophenate (Na PCP) are tabulated below.

TABLE II

| Water, ml./kg. mortar | Na PCP | | Shear strength | |
|---|---|---|---|---|
| | g./kg. mortar | Percent based on EHEC | kg. | Percent |
| 550 | 0 | 0 | 306 | 100 |
| 568 | 1.5 | 10 | 340 | 111 |
| 600 | 2.25 | 15 | 382 | 125 |
| 500 | 3.0 | 20 | 260 | 85 |
| 500 | 3.75 | 25 | 118 | 39 |
| 484 | 4.5 | 30 | 0 | 0 |
| 435 | 6.0 | 40 | 0 | 0 |
| 500 | 7.5 | 50 | 0 | 0 |

*Example 2*

A mortar composition comprising 30% of Portland cement and 70% of the same filler as in Example 1 together with 10 g. of high-viscosity hydroxyethylcellulose (HEC) per kg. of dry mortar was used in the same manner as in Example 1. The results are tabulated below.

TABLE III

| Water, ml./kg. mortar | Na PCP | | Shear strength | |
|---|---|---|---|---|
| | g./kg. mortar | Percent based on EHEC | kg. | Percent |
| 316 | 0 | 0 | 700 | 100 |
| 330 | 1.0 | 10 | 800 | 114 |

*Example 3*

The same mortar composition as in Example 2 was used except that medium viscosity ethyl-hydroxyethylcellulose (EHEC) was used instead of HEC, and that sodium 2,4,5-trichlorophenate (Na TCP) was used instead of Na PCP. The following results were obtained.

TABLE IV

| Water, ml./kg. mortar | Na TCP | | Shear strength | |
|---|---|---|---|---|
| | g./kg. mortar | Percent based on EHEC | kg. | Percent |
| 434 | 0 | 0 | 780 | 100 |
| 434 | 1.0 | 10 | 500 | 64 |
| 434 | 2.0 | 20 | 945 | 121 |
| 434 | 5.0 | 50 | 1,030 | 132 |
| 465 | 10.0 | 100 | 0 | 0 |

*Example 4*

The same procedure was used as in Example 3 except that a high viscosity methyl-hydroxyethylcellulose (MHEC) was used instead of HEC. The following results were obtained.

TABLE V

| Water, ml./kg. mortar | Na PCP | | Shear strength | |
|---|---|---|---|---|
| | g./kg. mortar | Percent based on MHEC | kg. | Percent |
| 10 | 0 | 0 | 810 | 100 |
| 10 | 1.0 | 10 | 900 | 111 |

*Example 5*

In this example, the following two mortar compositions were used.

FORMULA A

| | Percent |
|---|---|
| Portland cement | 30 |
| Filler (crushed quartzite max. particle size 1.5 mm.) | 69.5 |
| Ethyl-hydroxyethylcellulose (medium viscosity) | 0.5 |

Water, 180 ml. per kg. dry mortar.

FORMULA B

| | Percent |
|---|---|
| Portland cement | 30 |
| Filler (same as Formula A) | 69.45 |
| Ethyl-hydroxyethylcellulose (medium viscosity) | 0.5 |
| Na PCP | 0.05 |

Water, 180 ml. per kg. dry mortar.

The mortar compositions were used to join sintered floor tiles (non-absorbing material) and the compression strength, the bending tensile strength and the shear strength were determined after 7 days. The results are tabulated below.

TABLE VI

| Formula | Compression str. | | Bending tensile str. | | Shear str. | |
|---|---|---|---|---|---|---|
| | kg. | Percent | kg. | Percent | kg. | Percent |
| A | 67 | 100 | 57 | 100 | 118 | 100 |
| B | 100 | 149 | 70 | 123 | 148 | 125 |

*Example 6*

A mortar composition comprising 15% of Portland cement and 85% of filler (crushed marble, max. particle size 0.5 mm.) together with 15 g. of high-viscosity ethyl-hydroxyethylcellulose was used in a test series with varying amounts of Na PCP to join refractory bricks (non-absorbing material). The shear strength was determined after 7 days. The results are tabulated below.

TABLE VII

| Water, ml./kg. mortar | Na PCP | | Shear strength | |
|---|---|---|---|---|
| | g./kg. mortar | Percent based on EHEC | kg. | Percent |
| 364 | 0 | 0 | 390 | 100 |
| 528 | 2.25 | 15 | 570 | 146 |
| 530 | 3.0 | 20 | 425 | 109 |

*Example 7*

In this example, Portland cement mortar compositions were used to join ceramic tiles to light concrete, both being highly absorbing materials. Two basic mortar compositions were used containing (A) 1 part of Portland cement and 4 parts of sand (maximum particle size 2.5 mm.), and (B) 1 part of Portland cement and 7 parts of sand (maximum particle size 2.5 mm.). The shear strength in this case was determined after 7 and 28 days. The results are tabulated below.

TABLE VIII

| Mortar formula | Pretreatment of tiles | EHEC (med. visc.), g./kg. mortar | Na PCP, g./kg. mortar | Water-to cement ratio | Shear strength | | | |
|---|---|---|---|---|---|---|---|---|
| | | | | | 7 d. | | 28 d. | |
| | | | | | kg. | Percent | kg. | Percent |
| A | Watered | 0 | 0 | 0.63 | 145 | ---- | 420 | ---- |
| A | do | 1.0 | 0 | 0.55 | 820 | 100 | 945 | 100 |
| A | do | 1.0 | 0.1 | 0.51 | 630 | 77 | 1,365 | 144 |
| A | Unwatered | 0 | 0 | 0.63 | 0 | ---- | 0 | ---- |
| A | do | 5.0 | 0 | 0.55 | 610 | 100 | 775 | 100 |
| A | do | 5.0 | 0.5 | 0.51 | 715 | 117 | 1,680 | 216 |
| B | Watered | 0 | 0 | 1.27 | 210 | ---- | 252 | ---- |
| B | do | 1.0 | 0 | 1.02 | 505 | 100 | 840 | 100 |
| B | do | 1.0 | 0.1 | 0.96 | 485 | 96 | 1,890 | 225 |
| B | Unwatered | 0 | 0 | 1.27 | 0 | ---- | 0 | ---- |
| B | do | 10 | 0 | 1.02 | 502 | 100 | 630 | 100 |
| B | do | 10 | 0.1 | 0.96 | 502 | 100 | 1,680 | 267 |

*Example 8*

Mortar compositions according to the following formulas were used to join ceramic tiles to wood, particle board and hard wallboard:

FORMULA A

| | Percent |
|---|---|
| Portland cement | 30 |
| Crushed marble (max. particle size 0.75 mm.) | 69.5 |
| Ethyl-hydroxyethylcellulose (medium viscosity) | 0.5 |

Water, 200 ml. per kg. mortar.

FORMULA B

| | Percent |
|---|---|
| Portland cement | 30 |
| Crushed marble (max. particle size 0.75 mm.) | 69.45 |
| Ethyl-hydroxyethylcellulose (medium viscosity) | 0.50 |
| Na PCP | 0.05 |

Water, 130 ml. per kg. mortar.

The shear strength was determined after 7 days and the following results were obtained.

TABLE IX

| Formula | Shear strength on wallboard | | Shear strength on particle board | | Shear strength on wood | |
|---|---|---|---|---|---|---|
| | kg. | Percent | kg. | Percent | kg. | Percent |
| A | 315 | 100 | 105 | 100 | 0 | |
| B | 550 | 175 | 275 | 260 | 105 | |

Example 9.—Brick paste

The bending tensile strength (after 7 days) of joints made with brick paste according to the following formulas were determined.

FORMULA A

| | Percent |
|---|---|
| Portland cement | 30.0 |
| Filler (max. particle size 0.75 mm.) | 69.0 |
| Ethyl-hydroxyethylcellulose (medium viscosity) | 1.0 |

Water, 330 ml. per kg. dry comp.

FORMULA B

| | Percent |
|---|---|
| Portland cement | 30.0 |
| Filler (max. particle size 0.75 mm.) | 68.9 |
| Ethyl-hydroxyethylcellulose (medium viscosity) | 1.0 |
| Na PCP | 0.1 |

Water, 310 ml. per kg. dry comp.

FORMULA C

| | Percent |
|---|---|
| Portland cement | 30.0 |
| Filler (max. particle size 0.75 mm.) | 51.3 |
| Gypsum (½ $H_2O$) | 17.2 |
| Ethyl-hydroxyethylcellulose (high viscosity) | 1.5 |

Water, 370 ml. per kg. dry comp.

FORMULA D

| | Percent |
|---|---|
| Portland cement | 30.0 |
| Filler (max. particle size 0.75 mm.) | 51.15 |
| Gypsum (½ $H_2O$) | 17.20 |
| Ethyl-hydroxyethylcellulose (high viscosity) | 1.50 |
| Na PCP | 0.15 |

Water, 370 ml. per kg. dry comp.

The following results were obtained.

TABLE X

| Formula | Bending tensile strength | |
|---|---|---|
| | kg. | Percent |
| A | 304 | 100 |
| B | 392 | 129 |
| C | 348 | 100 |
| D | 435 | 127 |

Examples 10–17 below illustrate compositions which do not include inorganic binder materials but only filler material together with cellulose ether.

Example 10

A mortar composition consisting of 50% of filler of maximum particle size 0.5 mm., 50% filler of maximum particle size 0.75 mm. and 10 g. of high-viscosity ethyl-hydroxyethylcellulose per kg. of mortar was used to join tiles. The shear strength was determined after 14 days. The results are tabulated below.

TABLE XI

| Water, ml./kg. mortar | Na PCP | | Shear strength | |
|---|---|---|---|---|
| | g./kg. mortar | Percent based on EHEC | kg. | Percent |
| 280 | 0 | 0 | 338 | 100 |
| 273 | 1.0 | 10 | 359 | 106 |
| 350 | 1.5 | 15 | 384 | 113 |
| 360 | 2.0 | 20 | 375 | 111 |

It should further be noted that the adhesive effect of the composition was markedly improved by the addition of sodium pentachlorophenate, when evaluated as explained hereinbefore.

Example 11

The procedure was the same as in Example 10 except that 10 g. of high viscosity methylcellulose (MC) and 10 g. of high-viscosity methyl-hydroxyethylcellulose (MHEC) were used instead of EHEC. The results are tabulated below.

TABLE XII

| Cellulose ether | Water, ml./kg. mortar | Na PCP | | Shear strength | |
|---|---|---|---|---|---|
| | | g./kg. mortar | Percent based on cellulose ether | kg. | Percent |
| MC | 266 | 0 | 0 | 250 | 100 |
| MC | 316 | 1.0 | 10 | 280 | 112 |
| MHEC | 320 | 0 | 0 | 273 | 100 |
| MHEC | 320 | 1.0 | 10 | 295 | 106 |

Example 12

The procedure was the same as in Example 10 except that the filler consisted of 50% of 0.3 mm. max. particle size and 50% of 0.5 mm. max. particle size and 15 g. of EHEC were used instead of 10 g. per kg. of filler. The following results were obtained.

TABLE XIII

| Water, ml./kg. mortar | Na PCP | | Shear strength | |
|---|---|---|---|---|
| | g./kg. mortar | Percent based on EHEC | kg. | Percent |
| 364 | 0 | 0 | 420 | 100 |
| 380 | 1.5 | 10 | 915 | 217 |
| 460 | 2.25 | 15 | 785 | 184 |
| 600 | 4.5 | 30 | 670 | 160 |

Example 13

The procedure was the same as in Example 12 except that a high viscosity hydroxethylcellulose (HEC) was used instead of EHEC. The following results were obtained.

TABLE XIV

| Water, ml./kg. mortar | Na PCP | | Shear strength | |
|---|---|---|---|---|
| | g./kg. mortar | Percent based on HEC | kg. | Percent |
| 355 | 0 | 0 | 790 | 100 |
| 400 | 2.25 | 15 | 955 | 121 |

Example 14

Light concrete bricks were joined with mortar compositions comprising 50% filler of 0.50 mm. maximum particle size, 50% filler of 0.75 mm. particle size and (A) 15 g. of high-viscosity hydroxyethylcellulose per kg. mortar and (B) 15 g. of high viscosity methyl-hydroxyethylcellulose per kg. mortar. The shear strength was determined after 14 days. The results are tabulated below.

TABLE XV

| Cellulose ether | Water, g./kg. mortar | Na PCP | | Shear strength | |
|---|---|---|---|---|---|
| | | g./kg. mortar | Percent based on cellulose ether | kg. | Percent |
| HEC | 385 | 0 | 0 | 470 | 100 |
| HEC | 400 | 2.25 | 15 | 900 | 189 |
| MHEC | 380 | 0 | 0 | 540 | 100 |
| MHEC | 500 | 2.25 | 15 | 590 | 109 |

*Example 15*

The mortar and procedure were the same as in Example 10 except that sodium 2,4,5-trichlorophenate (Na TCP) was used instead of Na PCP and 15 g. instead of 10 g. EHEC were used. The results are tabulated below.

TABLE XVI

| Water, ml./kg. mortar | Na TCP | | Shear strength | |
|---|---|---|---|---|
| | g./kg. mortar | Percent based on EHEC | kg. | Percent |
| 570 | 0 | 0 | 320 | 100 |
| 600 | 1.5 | 10 | 206 | 64 |
| 630 | 3.0 | 20 | 395 | 123 |
| 630 | 7.5 | 50 | 320 | 100 |
| 630 | 15 | 100 | 404 | 126 |

*Example 16*

Refractory bricks were joined with a mortar composition comprising 50% filler of 0.3 mm. maximum particle size and 50% filler of 0.5 mm. maximum particle size together with 15 g. high viscosity ethyl-hydroxyethylcellulose. The shear strength values were determined after 14 days. The results are tabulated below.

TABLE XVII

| Water, ml./kg. mortar | Na PCP | | Shear strength | |
|---|---|---|---|---|
| | g./kg. mortar | Percent based on EHEC | kg. | Percent |
| 364 | 0 | 0 | 610 | 100 |
| 380 | 1.5 | 10 | 825 | 135 |
| 460 | 2.25 | 15 | 660 | 108 |
| 630 | 4.2 | 28 | 660 | 108 |

*Example 17*

The composition and procedure were the same as in Example 16 except that high-viscosity hydroxyethylcellulose (HEC), high-viscosity methylcellulose (MC) and high-viscosity methyl-hydroxyethylcellulose were used instead of EHEC. The results are tabulated below.

TABLE XVIII

| Cellulose ether | Water, ml./kg. mortar | Na PCP | | Shear strength | |
|---|---|---|---|---|---|
| | | g./kg. mortar | Percent based on cellulose ether | kg. | Percent |
| HEC | 384 | 0 | 0 | 690 | 100 |
| HEC | 400 | 2.25 | 15 | 830 | 120 |
| MC | 380 | 0 | 0 | 345 | 100 |
| MC | 500 | 2.25 | 15 | 420 | 122 |
| MC | 530 | 3.0 | 20 | 570 | 165 |
| MHEC | 430 | 0 | 0 | 415 | 100 |
| MHEC | 520 | 2.25 | 15 | 520 | 125 |

In the above examples the "filler" consisted of crushed marble except in Example 5 wherein crushed quartzite was used and Example 7 wherein sand was used. The particle size distributions of the filler materials were as follows:

Sand—maximum particle size 2.5 mm.: Percent
    Through 1 mm. _____ 67
    Through 0.5 mm. _____ 34
    Through 0.25 mm. _____ 18
Filler—maximum particle size 1.5 mm.: Percent
    Through 1 mm. _____ 96
    Through 0.5 mm. _____ 69
    Through 0.25 mm. _____ 32
Filler—maximum particle size 0.75 mm.: Percent
    Through 0.5 mm. _____ 84
    Through 0.25 mm. _____ 55
    Through 0.10 mm. _____ 30
Filler—maximum particle size 0.5 mm.: Percent
    Through 0.25 mm. _____ 95
    Through 0.15 mm. _____ 75
    Through 0.09 mm. _____ 50
Filler—maximum particle size 0.3 mm.: Percent
    Through 0.125 mm. _____ 54
    Through 0.075 mm. _____ 31
    Through 0.03 mm. _____ 11

The terms "high viscosity" and "medium viscosity" used in connection with the cellulose ethers in the above examples are as follows:

EHEC                                                                  Cps.
    Medium viscosity _____ 2000–5000
    High viscosity _____ 5000–12000
HEC
    Medium viscosity _____ 700–5000
    High viscosity _____ 5000–12000
MC
    Medium viscosity _____ 2000–5000
    High viscosity _____ 5000–10000
MHEC
    Medium viscosity _____ 2000–4000
    High viscosity _____ 4000–8000

These viscosities are all determined in 2% aqueous solutions at 20° C. in a Brookfield viscometer.

The following Table XIX summarizes the results of Examples 1–17 above and indicates the optimum percent strength improvement in each case as compared to the control samples, i.e., mortar or paste containing only cellulose ether but no chlorinated phenol salt.

TABLE XIX.—SUMMARY

| Ex. | Mortar or paste type | Type of base material | Cellulose ether | Optimum strength improvement, percent |
|---|---|---|---|---|
| 1 | Cement plus filler | Absorbing | EHEC, HV | 25 |
| 2 | do | do | HEC, HV | 25 |
| 3 | do | do | EHEC, MV | 32 |
| 4 | do | do | MHEC, HV | 11 |
| 5 | do | Non-absorbing | EHEC, HV | 49, 25, 23 |
| 6 | do | do | EHEC, HV | 46 |
| 7 | Cement plus sand | Absorbing | EHEC, MV | 167 |
| 8 | Cement plus filler | do | EHEC, MV | 160 |
| 9 | Brick paste | do | EHEC, MV, HV | 29 |
| 10 | Filler | do | EHEC, HV | 13 |
| 11 | do | do | MC, HV | 12 |
| 12 | do | do | MHEC, HV | 6 |
|    |    |    | EHEC, HV | 117 |
| 13 | do | do | HEC, HV | 21 |
| 14 | do | do | HEC, HV | 89 |
|    |    |    | MHEC, HV | 9 |
| 15 | do | do | EHEC, HV | 26 |
| 16 | do | Non-absorbing | EHEC, HV | 35 |
|    |    |    | HEC, HV | 20 |
| 17 | do | do | MC, HV | 65 |
|    |    |    | MHEC, HV | 25 |

MC = methylcellulose
HEC = hydroxyethylcellulose
EHEC = ethyl-hydroxyethylcellulose
MHEC = methyl-hydroxyethylcellulose
HV = high viscosity
MV = medium viscosity It will be seen from Table XIX that the optimum strength improvements obtained by the combination of cellulose ether and chlorinated phenol salt in accordance with this invention is within the range of from 9% to 167%, the latter very good result being obtained when attaching dry ceramic tiles on dry light weight concrete. The result is the more remarkable as dry tiles attached to a dry base with a conventional mortar comprising no cellulose ether gives no shear strength at all, with a normal mortar containing cellulose ether a strength was obtained which is considerably above that obtainable with conventional mortar, watered tiles and watered base, but with a mortar containing the cellulose ether phenol salt combination in accordance with this invention, strength values were obtained which were 167% better than the just mentioned strength values, which are quite satisfactory per se (see Example 7, Formulas A and B). The good strength improvement with the last-mentioned mortar proves that the water retention is very good which makes for a complete and adequate setting of hydraulic mortars. A mortar containing no addition of cellulose ether is not capable of building up any strength at all on account of a great loss of moisture to the atmosphere and a great absorption of moisture into the surrounding tiles and base. Such mortars soon become soft and crumbling, in particular if it is attempted to apply them in thin layers on a dry base. A mortar prepared in accordance with the present invention is well adapted to be applied in thin layers.

Example 8, wherein organic bases have been tested, is also of great interest. Ceramic tiles have been attached with a mortar comprising only a medium viscosity cellulose ether (Formula A) and with a mortar comprising the combination of cellulose ether and chlorophenol salt of this invention (Formula B). This example shows that on wallboard a strength improvement in the mortar of 75% has been obtained. On particle board, the corresponding improvement is 160% and on solid wood it has not been possible at all to attach the tiles with Formula A while tiles attached with a mortar according to Formula B have resisted an average shear force of 105 kg. per tile.

Example 12 exemplifies a typical paste, which might also be designated a "tile fix" comprising as the only binder the combination of cellulose ether and chlorophenol salt. Since no hydraulic binders are present in this formula, the paste is storable for an indefinite time provided that it is stored in the absence of air in a tube or the like, which is a very valuable property in many cases. Example 12 also shows that an optimum strength improvement of 117% is obtained, which is a very good evidence of the superior adhesive properties of the combination cellulose ether chlorophenol salt. That, e.g., a "tile fix" of desirable properties can be made from only a filler material and the cellulose ether chlorophenol salt combination as the sole binder has also been proved by practical use. Thus, an easily worked paste or "fix" of good pliability was obtained which in each case was capable of retaining the tiles exactly in position after they had been correctly positioned.

A paste which has been found particularly suitable for attaching insulating material, such as mineral or glass wool mats, felts, plates and/or sheets and various types of polymeric plastic materials, such as expanded polystyrene, may have any one of the following formulations, wherein the compositions are given in parts by weight.

(A)

Portland cement _____ 15.00
Filler material (max. 0.5 mm.) _____ 83.50
High viscosity cellulose ether _____ 1.35
Sodium pentachlorophenate _____ 0.15
Water, 400 to 430 ml. per kg. paste.

(B)

Filler material (max. 1.5 mm.) _____ 98.50
High viscosity cellulose ether _____ 1.27
Sodium pentachlorophenate _____ 0.23
Water, 490 to 510 ml. per kg. paste.

I claim:
1. A method of increasing the strength and improving the adhesive action of a composition comprising an inorganic filler and a minor amount of a water-soluble nonionic cellulose ether which comprises adding to said composition a water-soluble salt of a chlorophenol in an amount of 5 to 50% based on the dry weight of said cellulose ether.

2. A method as in claim 1 in which 5 to 30% of sodium pentachlorophenate is added to said composition based on the dry weight of said cellulose ether.

3. A method as in claim 1 in which said water-soluble nonionic cellulose ether is selected from the group consisting of ethyl-hydroxyethylcellulose, methyl-hydroxyethylcellulose, hydroxyethylcellulose and methylcellulose and mixtures thereof, and is added in an amount of 0.1 to 5% based on the dry weight of the total composition.

4. A method as in claim 1, in which said inorganic filler is selected from the group consisting of stone flour, kieselguhr, vermiculite and sand having a maximum particle size of 4 mm.

5. The method of claim 1 wherein the composition includes an inorganic binder.

6. A method as in claim 5 in which said inorganic binder is an hydraulic cement selected from the group consisting of Portland cement, aluminate cement, magnesium salt cement, slag cement, puzzolan cement, lime, gypsum and mixtures of said binders, said inorganic binder being added in an amount of 0 to 99% based on the dry weight of the total composition.

7. A binder composition adapted to be used as a mortar, wall coating, a compound for attaching and joining building tiles or brick paste having improved strength and adhesive properties, said composition comprising an inorganic filler, a minor amount of a water-soluble nonionic cellulose ether together with 5–50% based on the dry weight of said cellulose ether, of a water-soluble salt of a chlorophenol.

8. A binder composition as in claim 7 in which 5 to 30% of sodium pentachlorophenate is added to said composition based on the dry weight of said cellulose ether.

9. A binder composition as in claim 7 in which said water-soluble nonionic cellulose ether is selected from the group consisting of ethyl-hydroxyethylcellulose, methylhydroxyethylcellulose, hydroxyethylcellulose and methylcellulose and mixtures thereof, and is added in an amount of 0.1 to 5% based on the dry weight of the total composition.

10. A binder composition as in claim 7 in which said inorganic filler is selected from the group consisting of stone flour, kieselguhr, vermiculite and sand having a maximum particle size of 4 mm.

11. The composition of claim 7 including an inorganic binder.

12. A binder composition as in claim 11 in which said inorganic binder is an hydraulic cement selected from the group consisting of Portland cement, aluminate cement, magnesium salt cement, slag cement, puzzolan cement, lime, gypsum and mixtures of said binders, said inorganic binder being added in an amount of 0 to 99% based on the dry weight of the total composition.

References Cited by the Examiner

UNITED STATES PATENTS

| | | | |
|---|---|---|---|
| 2,328,290 | 8/43 | Neiderreither | 106—93 |
| 2,439,440 | 4/48 | Amberg | 106—90 |
| 3,030,258 | 4/62 | Wagner | 106—93 |
| 3,096,183 | 7/63 | Genth | 106—190 |

FOREIGN PATENTS

| | | |
|---|---|---|
| 555,708 | 4/58 | Canada. |
| 712,419 | 7/54 | Great Britain. |

TOBIAS E. LEVOW, *Primary Examiner.*